United States Patent [19]

Zimberg

[11] Patent Number: 4,689,154

[45] Date of Patent: Aug. 25, 1987

[54] PROCESS FOR REMOVING PHOSPHORUS FROM INDUSTRIAL WASTE WATER

[75] Inventor: Walter M. Zimberg, Tonawanda, N.Y.

[73] Assignee: Occidental Chemical Corporation, Niagara Falls, N.Y.

[21] Appl. No.: 798,508

[22] Filed: Nov. 15, 1985

[51] Int. Cl.[4] ............................................. C02F 1/52
[52] U.S. Cl. ................................. 210/667; 210/721; 210/737; 210/748; 210/760; 210/906
[58] Field of Search .............. 210/667, 668, 669, 718, 210/721, 726, 760, 906, 907, 737, 748

[56] References Cited

U.S. PATENT DOCUMENTS 3,876,451  4/1975  Zall .................................... 210/906
4,230,571  10/1980  Dadd ................................. 210/760
4,301,014  11/1981  Buckholtz et al. ................. 210/760
4,402,833  9/1983  Bennett et al. ..................... 210/906

Primary Examiner—Peter Hruskoci
Assistant Examiner—Jeffrey W. Peterson
Attorney, Agent, or Firm—James F. Tao; William G. Gosz

[57] ABSTRACT

An improved process is described for removing phosphorus from industrial waste water by contacting the waste water with ozone to convert reduced or organic phosphates into ortho-phosphates, and precipitating the soluble ortho-phosphates by treatment with lime. The precipitated material can be filtered, and the filtrate treated with activated carbon to produce an effluent stream having low levels of phosphorus.

The process of this invention is particularly effective at low treatment temperatures, enabling efficient treatment of the waste water during periods of cold weather.

4 Claims, No Drawings

PROCESS FOR REMOVING PHOSPHORUS FROM INDUSTRIAL WASTE WATER

BACKGROUND OF THE INVENTION

The present invention relates to a process for the efficient removal of phosphorus from industrial waste water streams. The process of this invention is particularly effective for treating waste waters at low temperatures, i.e. at waste water temperatures of from about 0° C. to about 10° C. This process thus provides an effective method for reducing the phosphorus contamination in waste ponds and streams during periods of cold weather.

Elemental phosphorus is produced commercially in an electric arc furnace by the thermal reduction of phosphate ore in the presence of coke and silica. The gaseous mixture generated by this reaction comprises phosphorus, water vapor, fluorosilicates, and other gaseous impurities, as well as entrained fine solid particles. Large quantities of water are consumed to cool the gases from the furnace and condense the phosphorus. Additional quantities of water are used during the process to protect the phosphorus from contact with the atmosphere and possible rapid oxidation and combustion.

The waste water effluent from the producing plant is frequently stored in holding ponds adjacent to the plant. The amount of water lost from the ponds through evaporation is usually sufficient to balance the water added to the ponds as plant effluent. However, during rainy periods which frequently occur in the winter on a seasonal basis, the additional precipitation causes the water in the pond to rise to a level which requires its discharge into public waterways.

This waste water typically contains dissolved phosphorus salts, generally in the form of ortho-phosphates, reduced and organic phosphates, suspended or colloidal phosphorus, and other inorganic solid materials that might be carried over from the furnace. The total phosphorus content of the waste water must be reduced prior to its safe discharge into the environment.

Sources of phosphorus-containing waste water, in addition to the waste water generated during phosphorus production, include water used in other operations that utilize phosphorus, such as water used in the loading and unloading of railroad cars used to transport phosphorus, water used to convert phosphorus to other chemical entities including phosphorus pentoxide, phosphoric acid, phosphorus pentasulfide, etc., or any other type of industrial waste water which contains phosphorus, regardless of its origin. The term "industrial waste water", as used herein, is therefore intended to include effluent waters generated in any of these industrial operations.

Recent concerns over the amount of phosphorus discharged into the environment have been prompted not only by phosphorus employed in manufacturing operations but in the commercial and private use of large quantities of phosphate compounds, such as detergent builders used in cleaning and washing. This concern has stimulated efforts to limit the discharge of phosphorus and phosphates into streams and lakes. Consequently, environmental regulations for industrial generators of phosphorus and phosphorus compounds have become increasingly more stringent concerning the amount of phosphorus which is permitted in plant discharges.

Several techniques are currently used to remove phosphorus and phosphates from industrial waste waters. See, for example, commonly assigned U.S. Pat. No. 4,402,833, issued Sept. 6, 1983, the disclosure which is incorporated by reference herein. This patent discloses the use of lime to precipitate soluble ortho-phosphates from industrial waste water effluent. The use of aeration immediately after the addition of lime to assist in precipitation is also disclosed, as is the use of activated carbon as an adsorbant in the final stage of treatment. The use of cationic polyelectrolytes and chlorination are also effective in reducing the level of phosphates. See U.S. Pat. No. 4,043,910 and British Pat. No. 888,085.

The techniques currently in use generally involve the addition of a precipitating agent to the waste water to convert soluble ortho-phosphates into insoluble phosphorus salts. The pH of the water is controlled to optimize the precipitation of insolubles, and consequent removal of phosphates.

Although these techniques have proven to be generally effective at reducing the level of phosphorus and phosphates in waste waters, newer and stricter regulations require further refinements to meet proposed environmental standards.

It is therefore an object of this invention to provide an improved process for removing phosphorus from industrial waste water which will meet existing and proposed environmental requirements under a variety of treatment conditions.

SUMMARY OF THE INVENTION

In accordance with the present invention, an improved process for removing phosphorus from industrial waste water comprises contacting the waste water with ozone to convert reduced phosphates to ortho-phosphates, precipitating the ortho-phosphates from the waste water with a precipitating agent such as lime, removing the precipitate by settling and filtration, and passing the treated waste water through an adsorbant material such as activated carbon. This process is suitable for use at both high or low temperatures, and thus can satisfy even stringent environmental standards during summer and winter operations.

DETAILED DESCRIPTION OF THE INVENTION

The industrial waste water which is employed in this invention is preferably the effluent water from a phosphorus production facility. This waste water will typically have a total phosphorus content of about 500 parts per million at the point of discharge from the plant. The phosphorus content includes components such as elemental phosphorus, which can be in dispersed, suspended or in colloidal form in the water, reduced phosphates dissolved in the water, and soluble ortho-phosphates. Waste water is also collected from various parts of the phosphorus manufacturing and storage processes, from operation such as loading and unloading of railroad cars used for transporting phosphorus, and from operations where elemental phosphorus is converted to other chemical entities. All of these waste waters are typically discharged into at least one holding pond located near the plant. The total phosphorus content of the pond water is generally too high to permit discharge into nearby streams, lakes and other water ways, and requires additional treatment for compliance with environmental standards.

The reduced phosphates contained in the waste water do not readily precipitate from the solution upon the addition of a precipitating agent to the water. These reduced phosphates must first be converted to ortho-phosphates for precipitation to occur.

It has now been found that ozone is an effective oxidizing agent which can be used to convert reduced phosphates to ortho-phosphates under a variety of normal operating conditions. The operating variable of primary concern is the water temperature, which can vary from 0° C. to 30° C. or more as the ambient temperature increases or decreases on a seasonable basis. Treatment of the waste water with ozone is effective to convert reduced phosphates, i.e. phosphates in a lower oxidation state than $(PO_4)^{-3}$, to ortho-phosphates. The use of ultraviolet radiation in combination with the ozone produces enhanced conversion of reduced phosphates to orthophosphates. However, the use of ultraviolet radiation is expensive and is not required to obtain adequate removal of phosphorus from the waste water.

The use of other oxidizing agents, such as potassium permanganate and hydrogen peroxide, have also been evaluated but have not been found completely satisfactory. Although these oxidizing agents are somewhat effective in the laboratory, their effectiveness is time and temperature dependent which renders them unsuitable for commercial application. For instance, they are only marginally effective at water temperatures of less than 15° C. and thus not suitable for cold weather operation. This is unfortunate since the greatest demand for treatment is during winter months when the precipitation and discharge levels are the highest.

After treatment of the waste water with ozone, a precipitating agent is added and dispersed in the water. Suitable precipitating agents include soluble calcium salts, usually lime (calcium oxide) or calcium hydroxide, alum, and salts of nickel, iron, barium, magnesium or cobalt. These precipitating agents are all capable of precipitating insoluble phosphate salts which can be readily separated from the waste water.

The amount of precipitating agent added to the waste water is not critical and will vary with the composition of the waste water. In general, when the precipitating agent is lime, sufficient lime is added until the pH of the water is in the region from about 9 to about 10. The pH of the waste water can be readily determined by reference to the pH of the incoming water, which is usually in the range of from about 6 to about 8.

After the addition of the precipitating agent, a polyelectrolyte, preferably a cationic type, can be added to the water to cause agglomeration of precipitating particles. This improves particle settling efficiencies.

The use of aeration also assists in improving phosphate precipitation, either by the conversion of elemental phosphorus to phosphates or in the removal of colloidal phosphorus due to enhanced flocculation. See U.S. Pat. No. 4,402,833.

After clarification or settling, the water can be filtered using a standard filtration bed. Typical filtration beds are composed of sand and anthracite coal of various particle sizes.

After filtration, the water is contacted with an adsorbent material such as activated carbon, diatomaceous earth or kieselguhr, fuller's earth, and the like. Activated carbon is preferred. The water can remain in contact with the activated carbon for a period of time or from about 15 minutes to about 60 minutes.

Upon exiting the activated carbon column, sufficient phosphorus is removed from the water to permit its discharge into public waterways.

The following examples are intended to illustrate various embodiments and advantages of the present invention without limiting it thereby.

EXAMPLE 1

125 ml. samples of pond water from a commercial phosphorus production facility were analyzed and found to have having an average total phosphorus content of 470 ppm. The samples were treated with sufficient lime (approximately 0.3 grams) to raise the pH of the water to 11.2. After precipitation and separation of insolubles, the filtrate was collected and was found to have an average total phosphorus content of 46 ppm.

EXAMPLE 2

A one-inch diameter by one-foot high quartz reactor was charged with a 125 ml sample of the commercial pond water of Example 1. The reactor was equipped with a coarse glass sparger located about one inch from the bottom of the reactor. Ozone was supplied to the reactor using a PCI Ozone Corp. ozone generator designed to produce up to one pound of ozone per day at a 2-4% concentration in air. The ozone was fed to the reactor at the rate of 700 mils per minute for a period of four minutes at an ozone generator setting of 50%. The amount of ozone absorbed by the sample was calculated as 0.73%. The sample temperature was maintained at 4° C. during the ozone addition.

After treatment with ozone, lime was added to the sample in an amount sufficient to raise the pH to 9.3 (approximately 1.64 grams). After precipitation and filtration of the solids, the total phosphorus content of the filtrate was measured as 18.0 ppm.

EXAMPLE 3

Following the procedure of Example 2, a 125 milliliter sample of the industrial waste water of Example 1 was contacted with ozone in a quartz reactor. The amount of ozone absorbed by the sample was calculated to be 0.79%. The temperature of the sample was maintained at 20° C. during the ozone addition.

After treatment with ozone, lime was added to the sample until a pH of 11 was recorded (approximately 0.2 grams). After separation of the precipitate, the filtrate was found to contain 19.3 ppm of total phosphorus.

EXAMPLE 4

Following the procedure of Example 2, a 125 milliliter sample of the industrial waste water of Example 1 was contacted with ozone in a quartz reactor. The amount of ozone absorbed by the sample was calculated as 0.47%. The temperature of the sample was maintained at 30° C. during ozone addition.

After treatment with ozone, lime was added to the sample until a pH of 11 was reached (approximately 0.27 grams). After separation of the precipitate, the filtrate was analyzed and found to contain 28.3 ppm of total phosphorus.

EXAMPLE 5

For purposes of comparison, 300 ppm of potassium permanganate was added to a 125 ml. sample of the commercial pond water of Example 1. The total phosphorus content of the sample was 360 ppm. The sample was contacted with the potassium permanganate for five minutes. The temperature of the sample was maintained at 4° C.

The sample was then treated with lime until a pH of 11.3 was recorded. After separation of the precipitate, the filtrate was analyzed and found to have a total phosphorus content of 57.6 ppm.

EXAMPLE 6

As an additional comparison, 400 ppm of hydrogen peroxide and 20 ppm of a ferric chloride catalyst was added to a 125 ml. sample of the industrial waste water of Example 5. The contact time was five minutes. The temperature of the water was maintained at 4° C.

The water sample was then treated with lime until a pH of 11.4 was reached. After separation of the precipitate, the filtrate was analyzed and found to have a total phosphorus content of 49 ppm.

While particular embodiments of the invention have been described herein, modifications and variations thereof will occur to those skilled in the art. It is to be understood, therefore, that the appended claims are intended to cover such modifications and variations which are within the scope and spirit of this invention.

What is claimed is:

1. A process for removing phosphorus from the effluent water from an elemental phosphorus production facility, said effluent water being stored in holding ponds adjacent to the facility, said process consisting essentially of the steps of:
    (a) contacting the pond water at a temperature of from about 0° C. to about 10° C. with ozone to convert reduced phosphates to ortho-phosphates,
    (b) contacting the pond water from step (a) with lime at a pH of from about 9 to about 10 to form a precipitate,
    (c) removing the precipitate by filtration, and
    (d) contacting the filtrate with an adsorbent material to produce water having a substantially reduced total phosphorus content.

2. The process of claim 1 wherein the waste water is contacted with ozone in the presence of ultraviolet radiation.

3. The process of claim 1 wherein the adsorbent material is activated carbon.

4. A process for removing phosphorus from the effluent water from an elemental phosphorus production facility, said effluent water being stored in holding ponds adjacent to the facility, said process consisting essentially of the steps of:
    (a) contacting the pond water at a temperature of from about 0° C. to about 10° C. with ozone to convert reduced phosphates to orthophosphates,
    (b) contacting the pond water from step (a) with lime at a pH of from about 9 to about 10 to form a precipitate,
    (c) aerating the pond water,
    (d) removing the precipitate by filtration, and
    (e) contacting the filtrate with activated carbon to produce water having a substantially reduced total phosphorus content.

* * * * *